United States Patent [19]

Nagel

[11] Patent Number: 4,971,725

[45] Date of Patent: Nov. 20, 1990

[54] THERMOCHROMIC DOUBLE-COMPLEX SALTS

[75] Inventor: Colleen C. Nagel, Arden Hills, Minn.

[73] Assignee: Minnesota Mining and Manufacturing Company, St. Paul, Minn.

[21] Appl. No.: 317,196

[22] Filed: Feb. 28, 1989

Related U.S. Application Data

[62] Division of Ser. No. 9,366, Jan. 30, 1987, Pat. No. 4,834,909.

[51] Int. Cl.$^5$ .............................................. C07F 15/00
[52] U.S. Cl. .................................. 252/408.1; 252/586; 252/962; 374/162; 556/136
[58] Field of Search ...................... 252/962, 408.1, 586; 350/353, 356, 357; 556/136; 558/302

[56] References Cited

U.S. PATENT DOCUMENTS

| | | | |
|---|---|---|---|
| 2,738,364 | 3/1956 | Reppe et al. | 260/486 |
| 3,197,493 | 7/1965 | Allison | 260/438 |
| 3,422,190 | 1/1969 | Ugi et al. | 424/226 |
| 3,458,542 | 7/1969 | Moore | 260/429 |
| 4,098,807 | 7/1978 | Stone et al. | 260/429 |
| 4,130,432 | 12/1978 | Wehner et al. | 106/15 R |
| 4,271,033 | 6/1981 | Gray et al. | 252/188.3 |
| 4,452,774 | 6/1984 | Jones et al. | 424/1.1 |
| 4,735,793 | 4/1988 | Jones et al. | 424/1.1 |
| 4,929,091 | 5/1990 | Kostic et al. | 252/408.1 X |

FOREIGN PATENT DOCUMENTS 1209798 1/1966 Fed. Rep. of Germany .

OTHER PUBLICATIONS

Purcell, K. F. et al., *Inorganic Chemistry*, (W. B. Saunders Co., Philadelphia, 1977), p. 751.
*Concepts and Models of Inorganic Chemistry*, 2nd ed., (John Wiley & Sons, Inc., 1983) pp. 368–376.
Bonati, F.; Minghetti, G. *Inorg. Chim. Acta* 1974, 9, 95–112.
Winzenburg, M. L.; Kargol, J. A.; Angelici R. J. *J. Organomet. Chem.* 1983, 249, 415–428.
Singleton, F.; Oosthuizen, H. E. *Adv. Organomet. Chem.* 1983, 22, 209–238.
Bonati, F.; Minghetti, G. *J. Organomet. Chem.* 1970, 24, 251.
Isci, H. and Mason, W. R. *Inorg. Chem.* 1975, 14, 913.
Mason, W. R.; Gray, H. B. *J. Am. Chem. Soc.* 1968, 90, 5721.
Isci and Mason *Inorg. Chem.* 1974, 13, 1175–1180.

*Primary Examiner*—Robert L. Stoll
*Assistant Examiner*—Daniel S. Metzmaier
*Attorney, Agent, or Firm*—Donald M. Sell; Walter N. Kirn; Lorraine R. Sherman

[57] ABSTRACT

Compositions of matter and methods of preparation are described for water and air stable, square planar transition metal double-complex salts which contain isonitrile ligands derivatized with long chain aliphatic groups. These salts are composed of two metal-containing complex ions: the cation is a tetrakis isonitrile metal ion and the anion is a tetrahalometallate or tetracyanometallate. These double-complex salts exhibit the novel property of thermochromism and are useful as temperature indicators and in imaging applications.

9 Claims, No Drawings

THERMOCHROMIC DOUBLE-COMPLEX SALTS

This is a division of application Ser. No. 07/009,366 filed Jan. 30, 1987 now U.S. Pat. No. 4,834,909.

TECHNICAL FIELD

This invention relates to transition metal double-complex salts, and dispersions and composites of these salts In another aspect, preparation of these complex salts is disclosed. The complex salts of the invention exhibit thermochromism and are useful as temperature indicators and in imaging applications.

BACKGROUND ART

Historically, transition metal complexes containing isonitrile ligands have been limited to those containing the few commercially available isonitriles like t-BuNC and PhNC or to the readily synthesized and purified isonitriles like MeNC, EtPhNC, MeOPhNC, and MePhNC, wherein t-Bu=tertiary butyl, Ph=phenyl, Et=ethyl, and Me=methyl. For a review see: Bonati, F.; Minghetti, G. *Inorg. Chim. Acta* 1974, 9, 95–112. Only recently have complexes containing more 'exotic' isonitriles been studied (Winzenburg, M. L.; Kargol, J. A.; Angelici, R. J. *J.Organomet. Chem.* 1983, 249, 415–428).

Salts o( the type [L$_4$M][M'X$_4$] are known as double-complex salts, i.e. the salt is composed of two metal-containing complex ions. Salts where L is an amine or isonitrile, X is a halide or cyanide, and both M and M' are platinum have been known for many years. For a recent review of metal isocyanide complexes see: Singleton. E; Oosthuizen, H. E. *Adv. Organomet. Chem.* 1983, 22, 209–238. Both the cation and anion in these complexes have square-planar geometries and often assume structures in which the ions form mixed stacks; the resulting metal-metal interactions cause these solids to be intensely colored despite the fact that the component ions absorb below 350 nanometers (nm) (Bonati, F.; Minghetti, G. *J. Organomet. Chem.* 1970, 24, 251; . Isci, H. and Mason, W. R. *Inorg. Chem.* 1975, 14, 913; Mason, W. R.; Gray, H. B. *J. Am. Chem. Soc.* 1968, 90, 5721). A study of the optical properties of these salts is reported by Isci and Mason (*Inorg. Chem.* 1974, 13, 1175–1180). Simple salts having cations of the type [(RNC)$_4$M]$^{n+}$ where M includes radioactive isotopes of Rh(n=1) and Ni, Pd, or Pt(n=2), and R is an organic radical are described in U.S. Pat. No. 4,452,774 for use as diagnostic agents for labeling living cells. U.S. Pat. No. 4,271,033 discloses binucleating biisocyanide complexes of Rh, Pt, Pd, and Ni useful as catalysts Isonitrile or isocyanide complexes of copper, described in U.S. Pat. No. 3,197,493, are useful as intermediates in the preparation of isonitriles.

U.S. Pat. No. 4,130,432 claims alkyl tin tetracyanometallates as biocides. Double salts of tetracyanoaurate useful for plating gold alloys are disclosed in U.S. Pat. No. 3,458,542. Tetrahalonickelates useful as catalysts are taught in U.S. Pat. No. 2,738,364.

SUMMARY OF THE INVENTION

Briefly, the present invention provides a novel dispersion comprising (a) an insoluble transition metal double-complex salt having four isonitrile ligands selected from aliphatic, aryl and arenyl isonitrile ligands, at least one of which is (1) a linear, branched, or cyclic aliphatic isonitrile ligand comprising at least 8 atoms not counting hydrogen, or (2) an arenyl isonitrile ligand in which the aliphatic portion of the arenyl group contains at least 5 atoms not counting hydrogen, and in which the metals are the same or different and are chosen from metals having a d$^8$ electronic configuration or are capable of forming square planar complexes, and (b) a non-halogenated organic liquid.

Certain classes of the transition metal double-complex salts of the dispersions of the invention are themselves novel, namely those having the formula

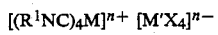

wherein each R$^1$ is independently selected from aliphatic, aryl, and arenyl groups with the proviso that at least one R$^1$ is a linear, branched, or cyclic aliphatic group having 8 to 20 carbon and optional heteroatoms, or at least one R$^1$ is an arenyl group having 11 to 26 carbon and optional heteroatoms and having an aliphatic portion, which aliphatic portion contains at least 5 carbon and optional heteroatoms, and in which the metals M and M' of formula I above are different metals, or M and M' both are Pd.

Additionally, the class of non-dispersible transition metal double-complex salts wherein M and M' are different or both M and M' are Pd is novel and has the formula

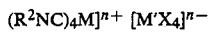

wherein R$^2$ is independently selected from linear, cyclic, or branched aliphatic groups having 1 to 7 carbon and optional heteroatoms wherein the heteroatoms can be 1 to 3 unitary S, N, and O atoms, or R$^2$ is an aryl or arenyl group having 6 to 10 carbon and optional heteroatoms, wherein the heteroatoms can be 1 to 5 unitary S, N, and O atoms.

The compounds of formula II, although not dispersible, exhibit thermochromism.

In still another aspect, the present invention provides composite structures wherein the dispersion of the invention (e.g., comprising an organic liquid and double-complex salt) is coated as a layer on a support and then dried, or the composite can be a continuous or discontinuous layer of complex salt of either formula I or II on a support, or it can be a self-supporting film.

In yet another aspect, there is provided a method for the preparation of double-complex salts having four isonitrile ligands independently substituted by aliphatic (having 1 to 20 carbon and optionally heteroatoms wherein the heteroatoms can be 1 to 7 unitary S, N, and O atoms), arenyl (having 7 to 26 carbon and optionally heteroatoms wherein the heteroatoms can be 1 to 10 unitary S, N and O atoms), and aryl (having 5 to 18 carbon and optionally heteroatoms wherein the heteroatoms can be 1 to 9 unitary S, N, and O atoms), in which the metals can be the same or different and are chosen from metals having a d$^8$ (8 electrons in the "d" orbital) electronic configuration or are capable of forming square planar complexes and the anion is a tetracyanometallate ion. The method involves reaction of stoichiometric amounts of bis-acetonitrile metal dihalide, the chosen aliphatic or aromatic (as defined above) isonitrile, and a salt of the tetracyanometallate ion, in an organic liquid (preferably non-halogenated organic liquid), optionally with a small amount of water added if it is desired to dissolve the tetracyanometallate salt;

stirring the reaction mixture at room temperature for an appropriate length of time, and isolating the desired product.

This improved method for preparation of the double-complex salts, which preferably are tetracyanometallates, via a non-ionic transition metal compound (see equation 6 below) provides an alternative route to Pt/Pt double-complex salts and the preferred route to the novel mixed transition metal double-complex salts of this invention.

The present invention provides double-complex salts having the property of thermochromism. It is unexpected that a class of these double-complex salts which are known to be insoluble in water and organic solvents can be dispersed in organic liquids and the dispersion is thermochromic. Members of this class of dispersible double-complex salts (formula I) all contain 1) at least one long chain aliphatic isonitrile ligand (having 8 to 20 carbon and optional heteroatoms) or 2) at least one arenyl (having 11 to 26 carbon and optional heteroatoms) isonitrile ligand in the cation of the transition metal double-complex salts, the arenyl ligand having an aliphatic portion containing at least 5 carbon and optional heteroatoms wherein the heteroatoms can be 1 or 2 unitary S, N, and O atoms.

Mixed transition metal double-complex salts, i.e. those in which M and M' (see formula I and II above) are different or both are Pd, constitute new compounds; synthesis and properties of such salts, it is believed, have never been reported. Double-complex salts of the present invention containing $[Pd(CN)_4]^{2-}$ as the anion are highly colored as well as fluorescent in the visible spectrum; thus, visual as well as instrumental and optical monitoring may be used to monitor temperature of compositions or articles which incorporate such double-complex salts.

Compounds of the present invention are chemically stable, inert to ambient conditions such as light, air, and humidity, yet have broad analytical applicability by exhibiting color and other physical changes induced by temperature change such as index of refraction and in some cases fluorescence. These novel compounds, compositions, and articles and composites containing them are useful as threshold temperature monitors or in laser or thermal imaging applications.

In this application the following terms are as defined below unless otherwise specified:

"aliphatic" means the monovalent group remaining after removal of a hydrogen atom from a linear, branched, or cyclic hydrocarbon having 1 to 20 carbon atoms and optional heteroatoms and includes such groups as alkyl, alkenyl, and alkynyl; the aliphatic group can optionally be interrupted by 1 to 7 unitary heteroatoms selected from S, N, and O;

"alkenyl" means the monovalent group remaining after removal of a hydrogen atom from a linear or branched chain hydrocarbon having 2 to 20 carbon atoms and optional heteroatoms which contains at least one double bond; the alkenyl group can be interrupted by 1 to 7 unitary heteroatoms selected from S, N, and O;

"alkynyl" means the monovalent group remaining after removal of a hydrogen atom from a linear or branched chain hydrocarbon having 2 to 20 carbon atoms and optional heteroatoms which contains at least one triple bond; the alkynyl group can be interrupted by 1 to 7 unitary heteroatoms selected from S, N, and O;

"aryl" means the monovalent group remaining after removal of one hydrogen atom from an aromatic or heteroaromatic compound which can consist of one ring or two or three fused or catenated rings having 5 to 18 ring atoms which can optionally include 1 to 6 unitary hetero ring atoms selected from S, N, and O;

"arenyl" means the monovalent group remaining after removal of a hydrogen atom from the aliphatic or aromatic portion of a hydrocarbon containing both aliphatic and aryl groups having 7 to 26 carbon and optional heteroatoms wherein the optional heteroatoms can be 1 to 10 unitary S, N, and O atoms; the aliphatic portion of the arenyl group can be attached to the isonitrile group in the isonitrile ligand, or the aryl portion of the arenyl group can be attached to the isonitrile group in the ligand; thus, arenyl includes, among other groups, aralkyl and alkaryl;

"thermochromism" means a color change induced by a temperature change;

"insoluble" means less than 0.1 g of a double-complex salt of the instant invention dissolves in 100 g of cyclohexane;

"dispersion" means a distribution of finely divided particles in a liquid medium that shows no tendency to settle in 20 minutes as determined by percent transmission measurement at 400 nm;

"fluorescent" means the immediate emission of light (UV, visible, or near IR) from a molecule after it has absorbed electromagnetic radiation;

"monitor" means any article, item, or means which is used to detect, sense, indicate, police, and the like, an existing condition or change in existing condition; and "threshold temperature monitor" means a monitor which irreversibly changes color or other physical property when a certain temperature has been attained or surpassed.

A certain class of thermochromic transition metal-containing double-complex salts of the present invention are also vapochromic and are disclosed in U.S. Pat. No. 4,826,774 filed the same date as this application.

DETAILED DESCRIPTION OF THE INVENTION

In a preferred embodiment, this invention provides transition metal double-complex salt dispersions in which the salt is composed of two metal-containing complex ions wherein the cation is a tetrakis (isonitrile) metal ion and the anion is a tetrahalometallate ion or tetracyanometallate ion having the formula $$(R^1NC)_4M]^{n+} \ [M'X_4]^{n-} \qquad \text{I}$$
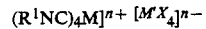

wherein each $R^1$ group is independently selected from the group consisting of aliphatic, aryl, and arenyl groups with the proviso that at least one $R^1$ group is a linear, branched, or cyclic aliphatic group having 8 to 20 atoms selected from carbon and optional heteroatoms wherein said optional heteroatoms are 1 to 7 unitary S, N, and O atoms, or at least one $R^1$ group is an arenyl group having 11 to 26 atoms selected from carbon and optional heteroatoms wherein said optional heteroatoms are 1 to 10 unitary S, N, and O atoms, and wherein the aliphatic portion of said arenyl group contains at least 5 atoms selected from carbon and optional heteroatoms wherein said heteroatoms are 1 to 2 unitary S, N, and O, atoms, and the metals M and M' are the same or different and are chosen from metals having a $d^8$ (8 electrons in the "d" orbital) electronic configuration or are capable of forming square planar complexes including Co(II), Rh(I), Ir(I), Ni(II), Au(III), Pt(II) and Pd(II), chosen such that n is one or two. X is a negatively charged ion, preferably an electron donating ion. Most preferably, X may be cyanide, halide, or other anion such as thiocyanate or mixtures thereof. The dispersing medium can be any non-halogenated organic liquid, oil or polymer, or combination thereof.

In the above formula for $R^1$, the aliphatic, aryl and arenyl groups can be substituted by 1 to 45 fluorine, chlorine and bromine atoms and/or 1 to 7 functional groups such as ester, olefin, hydroxy, aldehyde, acid, nitro, cyano and isonitrile groups. In the case of arenyl groups, the aryl portion may be substituted with 1 or 2 nonreactive groups such as halide, alkyl, alkoxy, nitro, silyl, siloxy etc. groups. It is generally the case that all ligands in a double-complex salt of the invention are the same, although mixtures of different ligands may be used to synthesize a mixture of double-complex salts which is useful in the present invention without separation into individual species. Preferred R groups are arenyl (most preferably alkaryl) groups having 11 to 26 carbon and optional heteroatoms.

The dispersing medium can be any non-halogenated organic liquid that does not react with the complex salt. Such liquids include any non-polar organic liquid such as hexane, toluene, benzene; moderately polar organic liquids such as diethyl ether or tetrahydrofuran; oils such as mineral oil; and polymers such as polybutene, and combinations of these liquids.

In the complex salts of Formula I, suitable $R^1$ groups include:

n—C₈H₁₇—

CH₃—O—CH₂CH₂—O—CH₂CH₂—O—CH₂CH₂—

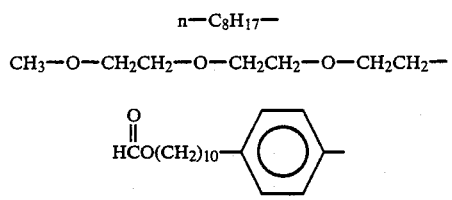

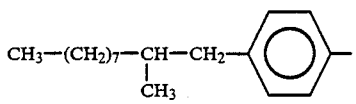

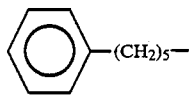

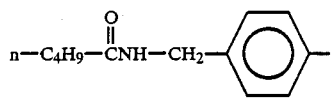

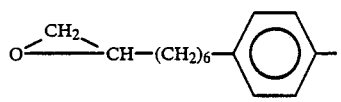

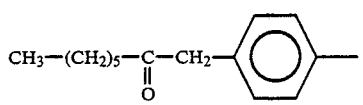

-continued

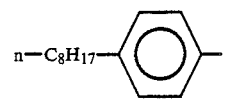

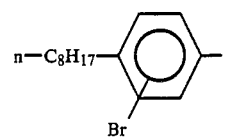

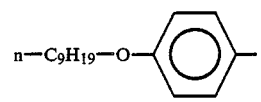

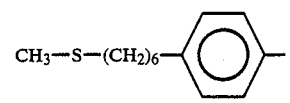

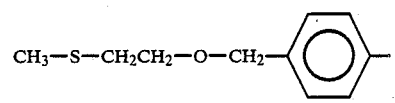

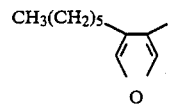

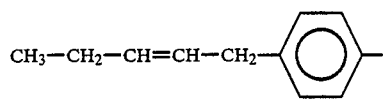

This invention further provides novel, non-dispersible transition metal double-complex salts wherein M and M' are different or both M and M' are Pd having the formula $$[(R^2NC)_4M]^{n+}[M'X_4]^{n-} \qquad II$$

wherein $R^2$ can be independently selected from the group consisting of aliphatic, aryl, and arenyl groups, wherein the aliphatic group comprises 1 to 7 atoms selected from carbon and optional heteroatoms wherein the heteroatoms are 1 to 3 unitary S, N, and O, atoms, wherein the aryl group comprises 5 to 10 carbon and optional heteroatoms wherein the heteroatoms are 1 to 6 unitary S, N, and O groups, and wherein the arenyl group comprises 7 to 10 atoms selected from carbon and optional heteroatoms wherein the heteroatoms are 1 to 5 unitary S, N, and O atoms.

$R^2$ can be substituted by 1 to 15 fluorine, chlorine, and bromine atoms and/or 1 to 3 functional groups such as ester, olefin, hydroxy, aldehyde, acid, nitro, cyano, and isonitrile groups.

In the case of arenyl groups, the aryl portion of the arenyl group can be substituted with 1 or 2 nonreactive groups such as halide, alkyl, alkoxy, nitro, silyl, or siloxy groups. It is generally the case that all ligands are the same, although mixtures of different ligands may be used to synthesize a mixture of double-complex salts which is useful in the present invention without separation into individual species. Preferably $R^2$ is an alkaryl group with 7 to 10 catenated carbon atoms. Although these salts are not dispersible they exhibit the property of thermochromism.

In the complexes of Formula II, suitable $R^2$ groups would include, but are not limited to:

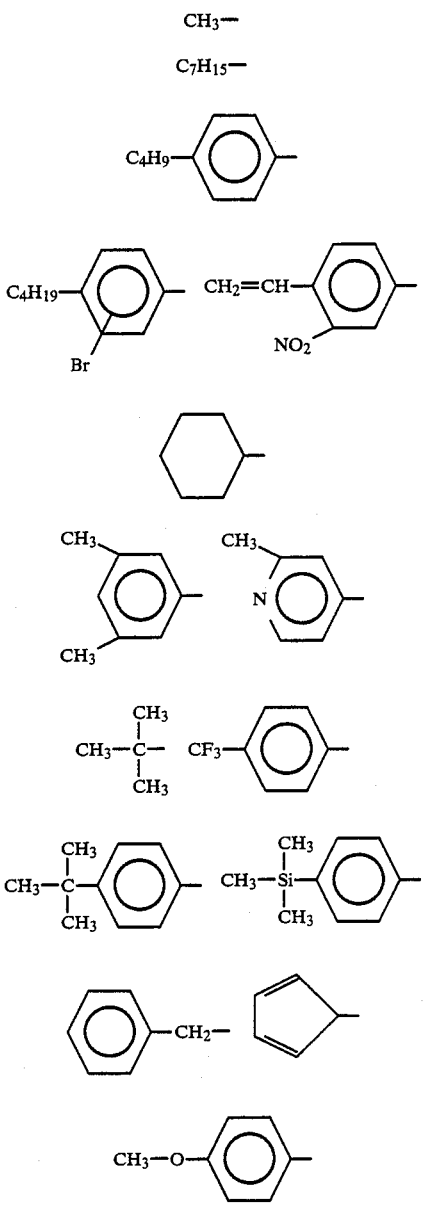

Preparation of the tetrakis(isonitrile)metal cation, wherein all $R^1$ are the same, has been accomplished by two routes: displacement of ligands such as halide from commercially available tetrahalometallates (Miller, J. S.; Balch, A. L. *Inorg. Chem.* 1972, 11, 2069) or by alkylation of commercially available tetracyanometallates (Treichel, P. M.; Knebel, W. J.; Hess, R. W. *J. Am. Chem. Soc.* 1971, 21, 5424) as shown below.

Displacement:

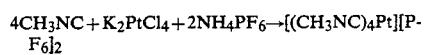  (eqtn. 1)

Alkylation

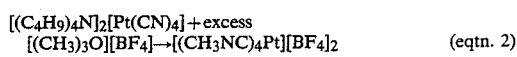  (eqtn. 2)

Synthesis of double-complex salts can be accomplished in one step if the halometallate starting material is also the desired anion, that is, when X=halide. For example, tetrachloroplatinate double-complex salts are made according to the following reaction (Bonati, F; Minghetti, G. *J. Organomet. Chem.* 1970, 24, 251).

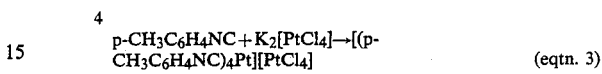  (eqtn. 3)

This method is useful for preparing double-complex salts wherein $R^1$ groups differ from each other, simply by using a mixture of different isonitriles in the preparation. The product obtained is a mixture of salts which may be used directly without separation for most applications.

Cyanometallate double-complex salts, where X=cyanide, are sometimes made in one step as well (Isci, H.; Mason, W. R. *Inorg. Chem.* 1974, 13, 1175), but contamination with tetrahalometallate can be a problem (Keller, H. J. and Lorentz, R. *J. Organomet. Chem.* 1975, 102, 119–122; and *Z. Naturforsch. B.* 1976, 31B, 565–568).

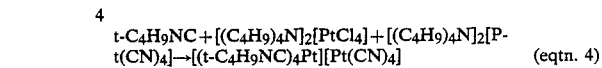  (eqtn. 4)

Metathesis can also be employed if salts of the metal-containing cation and anion have been previously isolated (Isci, H.; Mason, W. R. *Inorg. Chem.* 1974, 13, 1175).

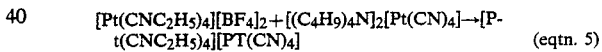  (eqtn. 5)

It has been found that the use of a non-ionic starting material, such as $(CH_3CN)_2PtCl_2$, as the cation source allows a wide variety of double-complex salts to be made in one step. Use of a non-ionic compound as the cation precursor ensures that no residual tetrahalo-substituted transition metal, the conventional starting material as shown in eqtn. 3, will contaminate the desired product; for example:

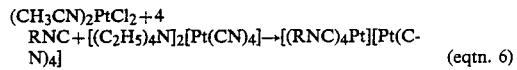  (eqtn. 6)

wherein R has the same definition as for either $R^1$ or $R^2$ above. This novel method is the method of choice for the preparation of cyanometallate double-complex salts. Bis-acetonitrile metal dihalides are the traditional starting materials for formation of bis-isonitrile metal dihalides but have not heretofore been used for double-complex salt synthesis. Other suitable non-ionic compounds include (cyclooctadiene) metal dihalide and bis-(benzonitrile) metal dihalide or any compound which has readily displaceable ligands. Again, a mixture of isonitriles may be used to produce a mixture of substituted complex salts which can be used directly for most applications. Furthermore, tetraethylammonium cation can be replaced by suitable cations such as alkali metal cations, or other ammonium or phosphonium cations.

A list of double-complex salts made is given in Table 1. All salts in which M and M' are different or when M and M' are Pd are novel. All double-complex salts are colored, air-stable, and insoluble in water and organic liquids. Halogenated liquids may cause a ligand redistribution reaction and are normally avoided. Some salts do, however, disperse readily in organic liquids which allows for the preparation of polymer coatings and composites comprising these materials.

TABLE 1

Complexes [(RNC)$_4$M][M'X$_4$]. Spectroscopic and/or elemental analyses supported the structural assignments of the double complex salts.

| R | M | M' | X | m.p. (°C.) | Compound No. |
|---|---|---|---|---|---|
| C$_6$H$_5$ | Pt | Pt | Cl | >194 dec | 1 |
|  | Pt | Pd | CN | * | 2 |
| p-C$_2$H$_5$C$_6$H$_4$ | Pt | Pt | Cl | 160 | 3 |
|  | Pt | Pt | CN |  | 4 |
| p-C$_4$H$_9$C$_6$H$_4$ | Pt | Pt | Cl | 152 | 5 |
|  | Pt | Pd | CN | * | 6 |
| p-C$_5$H$_{11}$C$_6$H$_4$ | Pt | Pt | Cl | 143 | 7 |
|  | Pt | Pt | CN | 159 | 8 |
| p-C$_6$H$_{11}$C$_6$H$_4$ | Pt | Pt | CN | 218 | 9 |
|  | Pt | Pd | CN | >185 dec | 10 |
| p-C$_6$H$_{13}$C$_6$H$_4$ | Pt | Pt | Cl | 137 | 11 |
|  | Pt | Pd | CN | 131 | 12 |
| p-C$_7$H$_{15}$C$_6$H$_4$ | Pt | Pd | CN | 128 | 13 |
| p-C$_8$H$_{17}$C$_6$H$_4$ | Pt | Pt | Cl | 134 | 14 |
|  | Pt | Pd | CN | 122 | 15 |
| p-C$_{10}$H$_{21}$C$_6$H$_4$ | Pt | Pt | Cl | 135 | 16 |
|  | Pt | Pt | CN | 146 | 17 |
|  | Pt | Pd | CN | 108 | 18 |
|  | Pd | Pt | CN | 108 | 19 |
|  | Pd | Pd | CN | * | 20 |
| p-C$_{12}$H$_{25}$C$_6$H$_4$ | Pt | Pt | Cl | 121 | 21 |
|  | Pt | Pt | CN | 150 | 22 |
|  | Pt | Pd | CN | 102 | 23 |
| p-C$_{14}$H$_{29}$C$_6$H$_4$ | Pt | Pd | CN | 98 | 24 |
| p-C$_8$H$_{17}$C$_6$H$_4$/ p-C$_{10}$H$_{21}$C$_6$H$_4$ | Pt | Pt | Cl | 121 | 25 |
| C$_{18}$H$_{37}$ | Pt | Pt | Cl | 90 | 26 |
| m-C$_8$H$_{17}$OC$_6$H$_4$ | Pt | Pt | Cl | * | 27 |
|  | Pt | Pd | CN | * | 28 |
| p-C$_{12}$H$_{25}$OC$_6$H$_4$ | Pt | Pt | Cl | 88 | 29 |
|  | Pt | Pd | CN | * | 30 |
| p-C$_4$H$_9$OC$_5$H$_{10}$C$_6$H$_4$ | Pt | Pd | CN | 96 | 31 |
| p-C$_6$H$_{13}$OC$_3$H$_6$C$_6$H$_4$ | Pt | Pt | CN | 152 | 32 |
|  | Pt | Pd | CN | 110 | 33 |
| p-CH$_3$OC$_{10}$H$_{20}$C$_6$H$_4$ | Pt | Pd | CN | 104 | 34 |
| p-HCO$_2$C$_8$H$_{16}$C$_6$H$_4$ | Pt | Pd | CN | * | 35 |
| p-HCO$_2$C$_{10}$H$_{20}$C$_6$H$_4$ | Pt | Pd | CN | * | 36 |
|  | Pt | Pt | Cl | * | 37 |
| p-C$_8$H$_{17}$CH(CH$_3$)-CH$_2$C$_6$H$_4$ | Pt | Pt | Cl | * | 38 |
|  | Pt | Pd | CN | 82 | 39 |
| p-C$_6$H$_5$C$_6$H$_4$ | Pt | Pt | Cl | 168 | 40 |
|  | Pt | Pd | CN | * | 41 |
|  | Pt | Pt | CN | 180 | 42 |

*not determined

It is known in the literature that Pt/Pt salts which contain alkyl isonitriles with up to four carbon atoms, for example [(C$_2$H$_5$NC)$_4$Pt][Pt(CN)$_4$], have slight solubility in a limited number of solvents such as ethanol, water, or acetonitrile (Isci, H.; Mason, W. R. *Inorg. Chem.* 1974, 13, 1175); in contrast, aryl isonitrile complexes are renowned for their insolubility (Bonati, F.; Minghetti, G. *J. Organomet. Chem.* 1970, 24, 251). Because thermochromic behavior depends on color present only in the solid state, complexes are only useful if they are insoluble in the media. In certain applications, e.g. for polymer coatings or optically clear coatings, dispersibility may be required. Therefore, insoluble but dispersible complexes in some instances are required for thermochromic composites. This invention teaches the design of novel molecules with both properties (insolubility and dispersibility) by the incorporation of ligands substituted with sufficiently long aliphatic groups. Such complexes lack solubility in all liquids with which they do not react yet disperse readily (spontaneously) in media such as non-halogenated organic liquids, polymer solutions, or oils to provide thermochromic indicators or monitors described below.

Dispersibility of the compounds of this invention was determined by the following test. Dispersions of [(R$_4$NC)$_4$][PtCl$_4$] in cyclohexane were made where R was phenyl, butylphenyl, pentylphenyl, hexylphenyl, and octylphenyl (Table 2). The concentration of complex was 0.001M. After shaking the mixture for 30 seconds, percent transmission (% T) at 400 nm was monitored over twenty minutes as shown in Table 2. After twenty minutes, the pentylphenyl, hexylphenyl, and octylphenyl derivatives remained dispersed as indicated by a 0% T reading; shorter chain length derivatives displayed light transmittance and sedimentation was observed in these samples indicating poor or no dispersibility.

TABLE 2

Results of dispersibility testing in cyclohexane at 400 nm for compounds [(RNC)$_4$Pt][PtCl$_4$].

| R | % T (t = 0) | % T (t = 20 min) |
|---|---|---|
| C$_6$H$_5$ | 3.5 | 26.0 |
| p-C$_4$H$_9$C$_6$H$_4$ | 0.0 | 10.3 |
| p-C$_5$H$_{11}$C$_6$H$_4$ | 0.0 | 0.0 |
| p-C$_6$H$_{13}$C$_6$H$_4$ | 0.0 | 0.0 |
| p-C$_8$H$_{17}$C$_6$H$_4$ | 0.0 | 0.0 |

The electron accepting or donating properties of the ligands as well as the metals chosen determine the ultimate color of the complexes. The chain length of the ligand determines both the temperature at which a color change occurs and the ease of dispersion of the complexes in organic media for the purpose of composite fabrication.

Thermochromism, i.e., color change with temperature, depends on an irreversible ligand redistribution reaction. R is R$^1$ or R$^2$ as defined above.

[(RNC)$_4$M][M'X$_4$]→(RNC)$_2$MX$_2$+(RNC)$_2$M'X$_2$  (eqtn. 7)

(colored→noncolored)

The double-complex salts are highly colored due to metal-metal interactions whereas the products of eqtn. 7 are usually colorless or slightly yellow. This reaction is especially suited for thermochromic and thermal imaging applications because it is irreversible. Because there are no byproducts of the reaction, there is no problem with outgassing or blistering in films composed of such materials. The ligand redistribution reaction occurs for all complexes regardless of chain length. It is believed that this reaction will occur regardless of the substitution, i.e. functional groups, heteroatoms, etc., in the aryl or aliphatic portions (R$^1$ and R$^2$) of the isonitrile ligand. The temperature at which the reaction occurs, the stability of the reactants and products, as well as the color of the complex salt will be affected by such substitution and it can be a means to more accurately select the desired thermochromic behavior. Alkaryl complexes in which M and M' are platinum are an intense blue and are especially suited for use as temperature monitors because of the extreme and vivid color change: blue to colorless or to slightly yellow.

This invention further teaches the flexibility of selecting the temperature at which a color change is desired. The temperature at which this ligand redistribution reaction (eqtn. 7) occurs can be manipulated by appropriate choice of chain length on the ligand; generally the reaction occurs at lower temperature the longer the ligand chain. Another method of selecting or setting the temperature at which the color change occurs is the judicious use of a mixture of isonitrile compounds used in the preparation of the double-complex salts.

Composites of double-complex salts can also be made which retain the thermochromic behavior of the salt and can be used as temperature monitors. For example, a salt of choice can be dispersed in a polymer. A solution containing the desired polymer with the double-complex salt dispersed therein can be coated and dried to produce a colored self-supporting film which changes color near the melting point of the complex salt.

Monitoring using the complexes of the present invention may be performed continuously, discontinuously, intermittently, or combinations thereof as required, until the threshold temperature is reached.

For temperature monitoring by fluorescence in the visible portion of the electromagnetic spectrum, the new class of mixed metal double-complex salts in which M is Pt and M' is Pd, formulas I and II above, are appropriate, where $R^1$ or $R^2$ are arenyl. The complexes are highly colored (e.g., pink, red, yellow), insoluble in organic or aqueous liquids, and fluorescent in the visible spectrum. In contrast, for M=M'=Pt or M=Pd, M'=Pt the complexes are also highly colored, insoluble, but are no longer strongly fluorescent in the visible spectrum.

The complexes described may be used in applications requiring visual, optical, or where useful, electronic assessment of temperature.

As noted above, the dispersion of the invention (e.g. a polymer and salt) can be coated as a layer on a support and then dried, or the composite can be a continuous or discontinuous layer of complex salt on a support. The support can be an inorganic support such as silica, alumina, a metal, glass, ceramic, or an organic such as paper, pressure-sensitive adhesive tape, or a polymer. In addition, the coating can be removed from a support to provide a self-supporting film.

Objects and advantages of this invention are further illustrated by the following examples, but the particular materials and amounts thereof recited in these examples, as well as other conditions and details, should not be construed to unduly limit this invention.

In certain cases in the Examples, specific salts of compounds were used, e.g. potassium salts, but one could equally as well use another alkali metal or tetraalkylammonium, ammonium, or phosphonium salt, as long as there is sufficient solubility of the reactants for the synthesis of the double-complex salts to occur in the reaction medium.

Examples of the synthetic sequences used in the samples are as follows.

Alkaryl isonitriles were synthesized from commercially available anilines which were converted to the formamides and dehydrated to isonitriles (Ugi, I.; Meyr, R. *Org. Syntheses* 1961, 41, 102; Bringmann, G.; Schneider, S. *Synthesis Comm.* 1983, 139–141).

Functionalized isonitriles (i.e., those that contain ether or ester linkages; see Table 1, compound numbers 27–37) were generally synthesized by formation of a functionalized alkylbenzene which was subsequently nitrated and then reduced to the aniline. The functionalized aniline was converted to the formamide and dehydrated to the isonitrile as described above.

(Isocyanophenyl)decyl formate was prepared by nitration of phenyldecanol, reduction to hydroxydecylaniline, formamidation to (formamidophenyl)decyl formate, and dehydration to (isocyanophenyl)decyl formate as described above.

The procedure for preparing the metal complexes $(CH_3CN)_2PtCl_2$ and $(CH_3CN)_2PdCl_2$ is in the literature (Walton, R. A. *Spectrochim. Acta* 1965, 21, 1795–1801). All compounds of this invention were identified by spectroscopic and/or elemental analysis. Compounds 9–19, 21–26, 29, 31–34, 39, 40, and 42 of Table 1, above, were readily dispersible in organic liquids.

EXAMPLE 1.

This example is typical of the synthesis of compounds 1, 3, 5, 7, 14, 16, 21, 26, 29, 32, 33, (Table 1).

$[(p-C_{12}H_{25}C_6H_4NC)_4Pt][PtCl_4]$(21). In 15 ml acetonitrile were combined 0.18 g (0.67 mmol) dodecylphenylisonitrile and 0.20 g (0.34 mmol) $[(C_2H_5)_4N]_2PtCl_4$. Warming to 45° C. produced a blue suspension. After cooling, the mixture was filtered to provide a blue solid which was washed and air dried to yield 0.20 g product, m.p.121° C. Additional product could be obtained from the filtrate. Upon heating the solid became essentially colorless (i.e. colorless or slightly yellow).

EXAMPLE 2

This example is typical of the synthesis of compounds 2, 6, 8, 13, 15, 23, 24, 30, 33, 34, 36 (Table 1). This example illustrates the preparation of a salt in which a potassium salt of the tetracyanometallate is used as a starting material. This method may be used to prepare all tetracyanometallate compounds listed in this invention although yields will vary according to the ligand used.

$[(p-C_{10}H_{21}C_6H_4NC)_4Pt][Pd(CN)_4]$ (compound 18, Table 1). To 30 ml $CH_3CN$ was added 0.31 g p-$C_{10}H_{21}C_6H_4NC$, 0.11 g $(CH_3CN)_2PtCl_2$, 0.10 g $K_2Pd(CN)_4\cdot 3H_2O$, and 10 ml water. After approximately one hour of stirring at room temperature, the suspension was filtered, the collected solid was washed successively with acetonitrile and water, and then air-dried. The yield was 61% of an intensely pink solid, m.p. 110° C. On application of heat the solid became essentially colorless.

EXAMPLE 3

This example illustrates the preparation of a salt in which a tetraethylammonium salt of the tetracyanometallate is used as a starting material. This method may be used in Example 2, above, to prepare all compounds listed although yields will vary according to the ligand used.

$[(p-C_8H_{17}C_6H_4NC)_4Pt][Pd(CN)_4]$ compound 15, Table 1). To 25 ml $CH_3CN$ was added 0.28g p-$C_8H_{17}C_6H_4NC$, 0.11 g $(CH_3CN)_2PtCl_2$, and 0.15 g $[(C_2H_5)_4N]_2[Pd(CN)_4]\cdot 3H_2O$. The reaction mixture was stirred at room temperature until infrared spectra showed no starting material remained. The suspension was filtered, the collected solid washed successively with acetonitrile and water, and air-dried. The yield was 0.20 g of an intensely pink solid, m.p. 122°–123° C. Upon heating the solid became essentially colorless.

EXAMPLE 4

This example is typical of the synthesis of compounds 4, 17, 22, 32 (Table 1).

$[(p-C_{10}H_{21}C_6H_4NC)_4\ Pt][Pt(CN)_4]$(compound 17, Table (1). To 20 ml $CH_3CN$ was added 0.31g $p-C_{10}H_{21}$ PhNC, 0.11 g $(CH_3CN)_2PtCl_2$, 0.14 g $K_2Pt(CN)_4\cdot 3H_2O$, and approximately 2 ml water. After approximately one hour of stirring at room temperature, the suspension was filtered, the collected solid was washed successively with acetonitrile, water, and acetonitrile, and air-dried to yield 0.25 g dark blue solid, m.p.146° C. Upon heating the solid became essentially colorless.

EXAMPLE 5

This example illustrates the preparation of a salt in which the cation contains palladium and the anion platinum, $[(p-C_{10}H_{21}C_6H_4NC)_4Pd][Pt(CN)_4]$ (compound 19, Table 1).

To 30 ml $CH_3CN$ was added 0.73 g $p-C_{10}H_{21}C_6H_4NC$, 0.13 g $(CH_3CN)_2PdCl_2$, $0.21 K_2Pt(CN)_4\cdot 3H_2O$ under nitrogen. After approximately twenty minutes of stirring at room temperature, the suspension was filtered, the collected solid washed successively with acetonitrile, water, acetonitrile, and petroleum ether, and air-dried. The yield was 68% of a maroon solid, m.p.108.5°–110° C. Upon heating the solid became essentially colorless.

EXAMPLE 6

This example illustrates the synthesis of a salt which contains a mixture of isonitrile ligands (compound 25, Table 1).

In 25 ml of acetonitrile were combined 0.07 g $p-C_8H_{17}C_6H_4NC$ and 0.08 g $p-C_{10}H_{21}C_6NC$ and 0.20 g $[(C_2H_5)N]_2PtCl_4$ was then added. After stirring for one hour at room temperature the mixture was filtered and the collected solid was washed successively with acetonitrile, water, and acetonitrile. A blue solid was isolated, 0.15 g with m.p.121°–123° C. Upon application of heat the solid became essentially colorless.

EXAMPLE 7

This example illustrates the preparation of a salt in which a tetrabutylammonium salt of the tetracyanometallate is used as a starting material. Other compounds from Table 1 made by this method were compounds 9, 10, 27, 28, 31, 38, 39, 40 41. This method was used to prepare compounds 9 and 10 and may be used to prepare any cyanometallate salt listed in Table 1 although yields may vary according to the ligand used.

$[(p-C_6H_{11}C_6H_4NC)_4Pt][Pd(CN)_4]$(compound 9 of Table 1). To 10 ml acetonitrile was added 0.18 g $p-C_6H_{11}C_6H_{11}C_6H_4NC$, 0.083 g $(CH_3CN)_2PtCl_2$, and 0.165 g $[(C_4H_9)_4N]_2[Pd(CN)_4]$. The reaction mixture was stirred at room temperature for 1 hour or until infrared spectra showed no starting material remained. The suspension was filtered, the collected solid washed with acetonitrile, and air-dried. The yield was 0.13 g of a fluorescent purple powder. Upon heating the solid turned tan.

EXAMPLE 8

This example illustrates the synthesis of a Pd/Pd salt, $[(p-C_{10}H_{21}C_6H_4NC)_4Pd][Pd(CN)_4]$(compound 20 of Table 1).

This reaction was conducted in an inert atmosphere of dry nitrogen gas.

To a solution of 0.49 g $p-C_{10}H_{21}C_6H_4NC$ in 5 ml acetonitrile was added 0.22 g $[(CH_3CN)_4Pd][BF_4]_2$ dissolved in 3 ml acetonitrile. To the resulting solution was added 0.35 g $(Bu_4N)_2[Pd(CN)_4]$. After 5 min. the resulting canary yellow precipitate was isolated by filtration and the solid was washed with pentane. The yield was 0.20 g solid which exhibited an infrared spectrum which indicated it contained the desired product.

EXAMPLE 9

This example illustrates preparation of a polymer composite.

To 10 g methyl ethyl ketone solution containing 1.0 g polyester resin (Vitel TM, type PE222, Goodyear Tire & Rubber Company, Akron, Ohio) was added 0.2 g $[(C_{12}H_{25}C_6H_4NC)_4Pt][PtCl_4]$(compound 21, Table 1) prepared as in Example 1. This blue dispersion was coated on glass slides using a knife coater to produce clear blue films. The coated slides became colorless when heated with a conventional laboratory heating gun, demonstrating thermochromism. The color change was useful as a temperature indicator. This film can be stripped away from the glass support prior to use to provide a self-supporting thermochromic monitor.

Various modifications and alterations of this invention will become apparent to those skilled in the art without departing from the scope and spirit of this invention, and it should be understood that this invention is not to be unduly limited to the illustrative embodiments set forth herein.

I claim:

1. A method of preparing a metal double-complex salt consisting essentially of the steps of:
   (a) reacting an admixture consisting essentially of essentially stoichiometric amounts of a ligand containing non-ionic metal dihalide having displaceable ligands, at least one aliphatic, aryl, or arenyl isonitrile compound and a metallate anion $(M'X_4)^{n-}$ in which M' and the metal in said metal dihalide are metals having a $d^8$ electronic configuration which are independently selected from the group consisting of Pt(II), and Pd(II), and X is a negatively charged electron-donating moiety, optionaly in the presence of water, and n is an integer 1 or 2, and
   (b) isolating the resulting at least one transition metal double-complex salt.

2. The method according to claim 1 wherein said metal dihalide is bis-acetonitrile metal dihalide, cyclooctadiene metal dihalide or (benzonitrile)$_2$ metal dihalide.

3. The method according to claim 1 wherein said transition metal double-complex salt has the formula

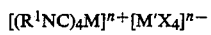

$$[(R^1NC)_4M]^{n+}[M'X_4]^{n-}$$

wherein
   each $R^1$ group is independently selected from the group consisting of aliphatic, aryl, and arenyl groups with the proviso that at least one $R^1$ group is a linear, branched, or cyclic aliphatic group having 8 to 20 atoms selected from carbon and heteroatoms wherein said heteroatoms are 0 to 7 unitary S, N, and O atoms, or at least one $R^1$ group is an arenyl group having 12 to 26 carbon and heteroatoms wherein said heteroatoms are 0 to 10 unitary S, N, and O atoms, and wherein the aliphatic portion of said arenyl group contains at least 6 carbon and heteroatoms wherein said heteroatoms are 0 to 2 unitary S, N, and O atoms, and the metals M and M' are the same or different and are chosen from metals as defined in claim 1, n is an integer 1 or 2, and X is a negatively charged ion.

4. The method according to claim 3 wherein said transition metal double-complex salt is selected from the group consisting of salts wherein n=2 and R', M, M', and X are as shown below:

| $R^1$ | M | M' | X |
|---|---|---|---|
| $C_6H_5$ | Pt | Pt | Cl |
|  | Pt | Pd | CN |
| p-$C_2H_5C_6H_4$ | Pt | Pt | Cl |
|  | Pt | Pt | CN |
| p-$C_4H_9C_6H_4$ | Pt | Pt | Cl |
|  | Pt | Pd | CN |
| p-$C_5H_{11}C_6H_4$ | Pt | Pt | Cl |
|  | Pt | Pt | CN |
| p-$C_6H_{11}C_6H_4$ | Pt | Pt | CN |
|  | Pt | Pd | CN |
| p-$C_6H_{13}C_6H_4$ | Pt | Pt | Cl |
|  | Pt | Pd | CN |
| p-$C_7H_{15}C_6H_4$ | Pt | Pd | CN |
| p-$C_8H_{17}C_6H_4$ | Pt | Pt | Cl |
|  | Pt | Pd | CN |
| p-$C_{10}H_{21}C_6H_4$ | Pt | Pt | Cl |
|  | Pt | Pt | CN |
|  | Pt | Pd | CN |
|  | Pd | Pt | CN |
|  | Pd | Pd | CN |
| p-$C_{12}H_{25}C_6H_4$ | Pt | Pt | Cl |
|  | Pt | Pt | CN |
|  | Pt | Pd | CN |
| p-$C_{14}H_{29}C_6H_4$ | Pt | Pd | CN |
| p-$C_8H_{17}C_6H_4$/ p-$C_{10}H_{21}C_6H_4$ $C_{18}H_{37}$ | Pt | Pt | Cl |
| m-$C_8H_{17}OC_6H_4$ | Pt | Pt | Cl |
|  | Pt | Pd | CN |
| p-$C_{12}H_{25}OC_6H_4$ | Pt | Pt | Cl |
|  | Pt | Pd | CN |
| p-$C_4H_9OC_5H_{10}C_6H_4$ | Pt | Pd | CN |
| p-$C_6H_{13}OC_3C_6H_4$ | Pt | Pt | CN |
|  | Pt | Pd | CN |
| p-$CH_3OC_{10}H_{20}C_6H_4$ | Pt | Pd | CN |
| p-$HCO_2C_8H_{16}C_6H_4$ | Pt | Pd | CN |
| p-$HCO_2C_{10}H_{20}C_6H_4$ | Pt | Pd | CN |
|  | Pt | Pt | Cl |
| p-$C_8H_{17}CH(CH_3)CH_2C_6H_4$ | Pt | Pt | Cl |
|  | Pt | Pd | CN |
| p-$C_6H_5C_6H_4$ | Pt | Pt | Cl |
|  | Pt | Pd | CN |
|  | Pt | Pt | CN. |

5. The method according to claim 3 wherein said metal double-complex salt has the formula

[(p-$C_{10}H_{21}C_6H_4NC)_4Pd$][$Pd(CN)_4$]. 

6. The method according to claim 3 wherein M is Pt and M' is Pd.

7. The method according to claim 3 wherein M is Pd and M' is Pt.

8. The method according to claim 3 wherein M and M' are Pt.

9. The method according to claim 3 wherein M and M' are Pd.

* * * * *